Sept. 24, 1940.   C. H. WILEY ET AL   2,215,680
TEST APPARATUS
Filed June 15, 1938   3 Sheets-Sheet 1
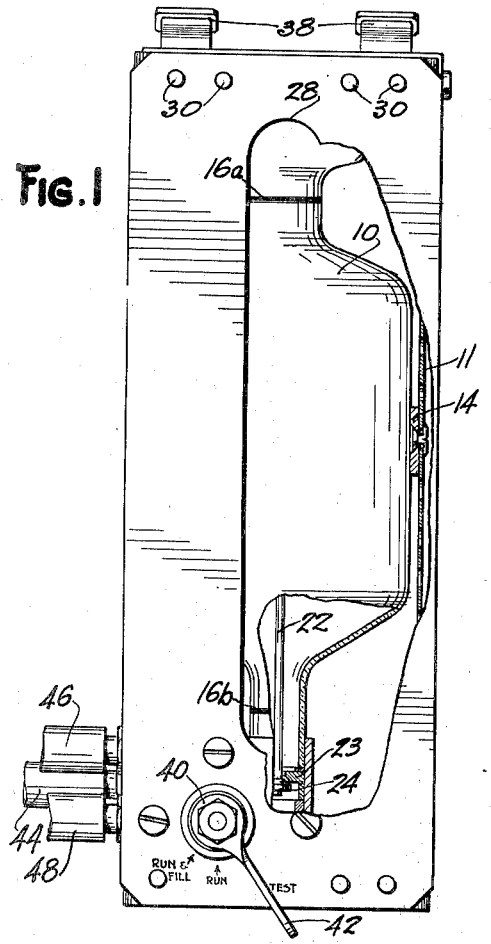
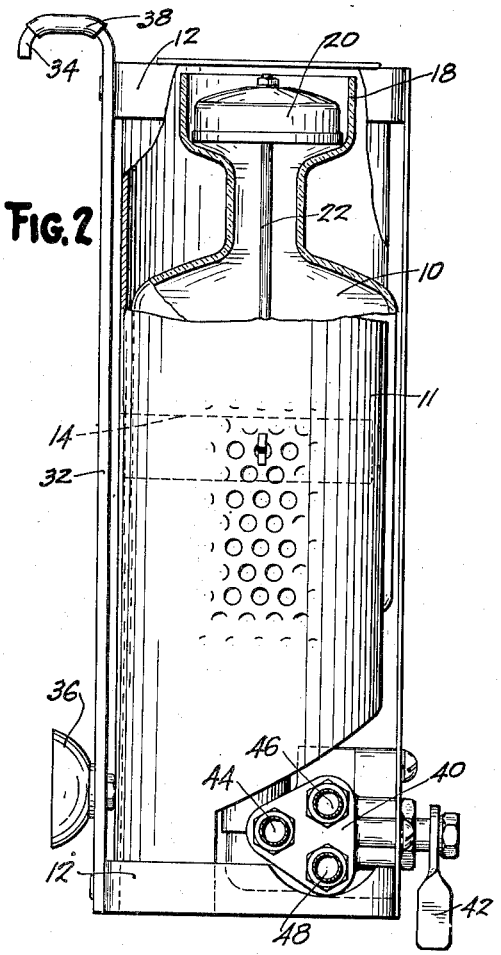
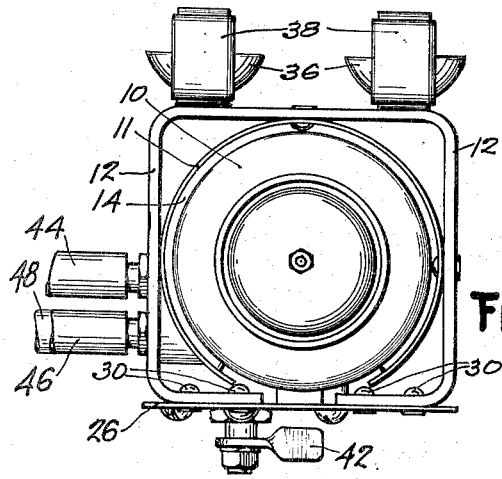
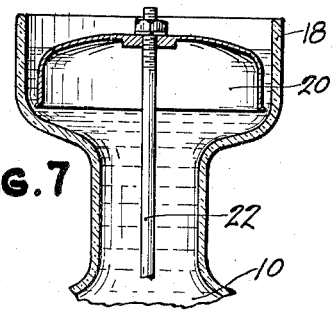
INVENTORS.
CHARLES H. WILEY
BY MAURICE BEN HEFTLER
ATTORNEY.

Sept. 24, 1940. C. H. WILEY ET AL 2,215,680
TEST APPARATUS
Filed June 15, 1938 3 Sheets-Sheet 2
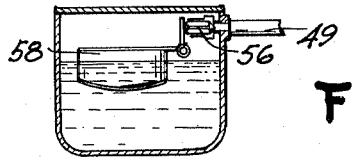
FIG. 4·A
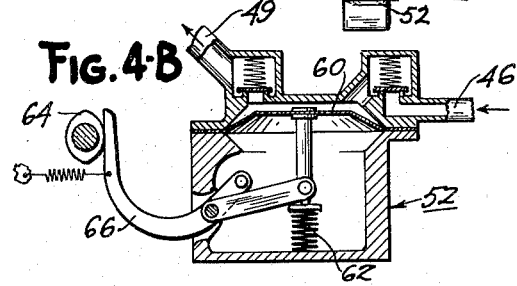
FIG. 4·B
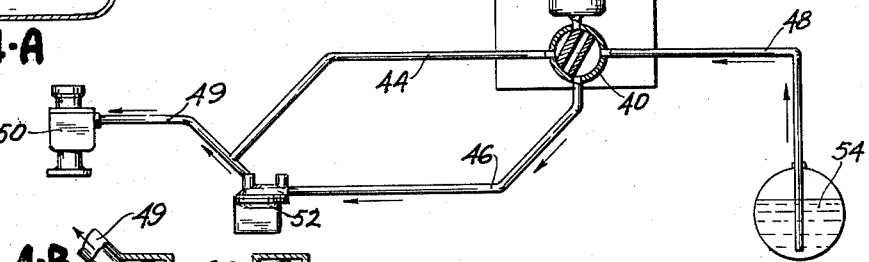
FIG. 4
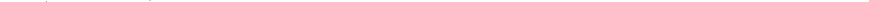
FIG. 5
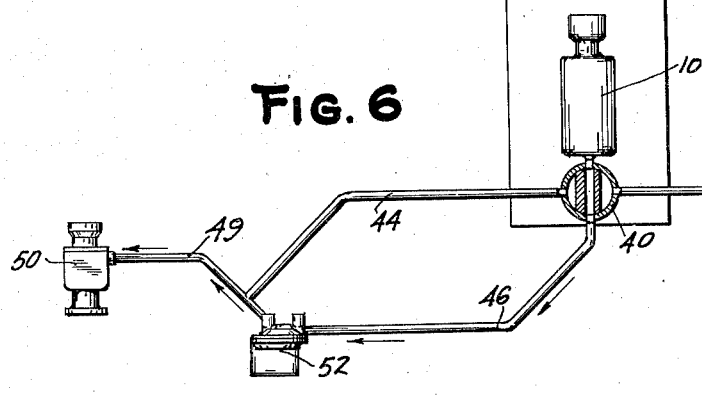
FIG. 6
INVENTORS.
CHARLES H. WILEY
MAURICE BEN HEFTLER
BY
ATTORNEY.

Sept. 24, 1940.   C. H. WILEY ET AL   2,215,680
TEST APPARATUS
Filed June 15, 1938   3 Sheets-Sheet 3
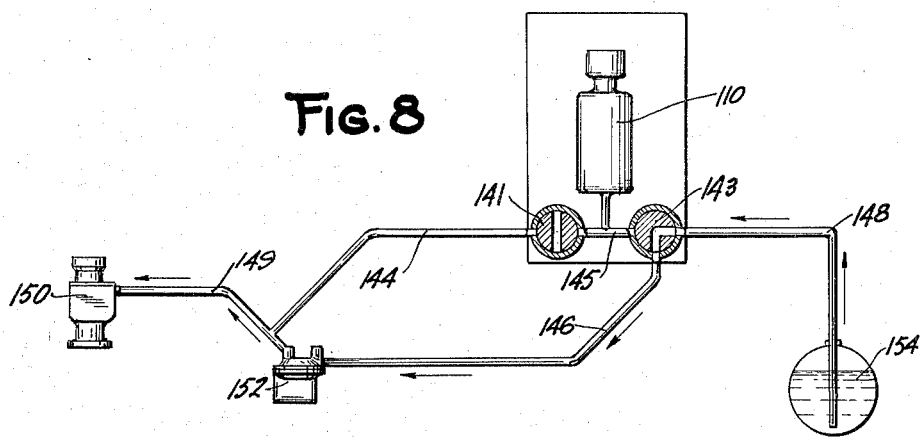
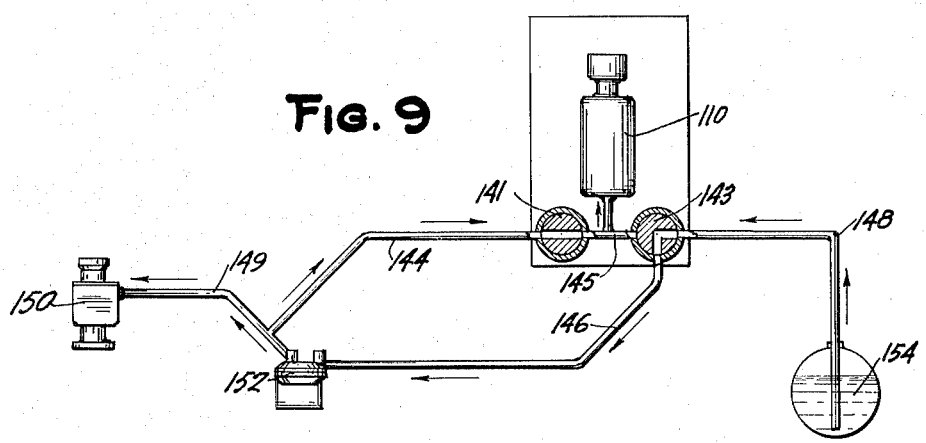
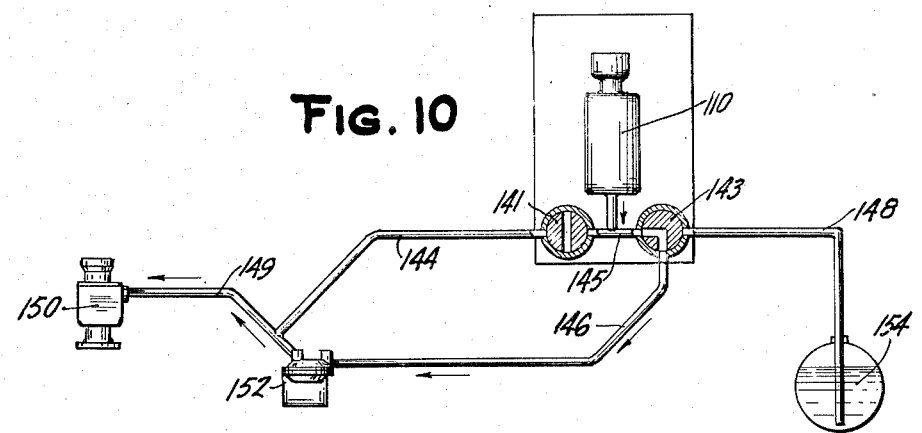
INVENTORS.
CHARLES H. WILEY.
BY MAURICE BEN HEFTLER.
ATTORNEY.

Patented Sept. 24, 1940

2,215,680

UNITED STATES PATENT OFFICE 2,215,680

TEST APPARATUS

Charles H. Wiley and Maurice Ben Heftler, Detroit, Mich., assignor to Zenith Carburetor Company, Detroit, Mich., a corporation of Michigan Application June 15, 1938, Serial No. 213,729

3 Claims. (Cl. 73—51)

This invention relates to testing devices and more particularly to such devices as are adapted to determine the mileage obtained from a vehicle upon the consumption of a given amount of fuel.

An object of the invention is to provide a simple, compact and economical device whereby rapid and accurate determination may be had of the consumption of fuel per unit distance of travel of the vehicle.

Another object of the invention is to provide a testing device comprising a calibrated reservoir or burette which may be attached to and refilled by the fuel pump of the vehicle. An advantage obtained by this arrangement is that when the test is being made the fuel supplied to the carburetor comes from the burette through the fuel pump and thence to the carburetor float chamber, and hence is supplied under the same pressure as that obtaining during normal running conditions, when the pump is drawing fuel from the usual fuel tank of the vehicle. This is a desirable function for accurate determination of fuel consumption, since any considerable variation in such pressure will affect the level of fuel in the carburetor float chamber, and hence the richness of the mixture produced by the carburetor.

A further object of the invention is to provide a device which can be filled by the fuel pump while the vehicle is operating normally, and one provided with a valve which prevents overflowing of the burette, thus obviating the danger of fire to the vehicle. Should the first test fail for some reason, the apparatus of the present invention may be re-set for a second test reading while the vehicle continues its normal operation.

Other objects and desirable particular constructions and arrangements of parts will become apparent upon reference to the following detailed description of the two illustrative embodiments shown in the accompanying drawings; in which:

Figure 1 is a front elevational view, partially in section, of a device embodying the invention, a part of the cover plate and burette being broken away;

Figure 2 is a side elevational view, partially in section, of the device shown in Figure 1;

Figure 3 is a top view of the device of Figure 1;

Figure 4 is a diagrammatic view of the device with the valve in "Run" position;

Figures 4—A and 4—B are enlarged views of the float chamber and fuel pump, respectively, of Figure 4;

Figure 5 is a diagrammatic view similar to Figure 4 with the valve in a "Run and Fill" position;

Figure 6 is a diagrammatic view similar to Figure 4 with the valve in a "Test" position.

Figure 7 is a fragmentary view showing the burette head with the bell head in its uppermost position;

Figure 8 is a diagrammatic view of a modified form of the invention, having two valves, shown in "Run" position;

Figure 9 is a diagrammatic view similar to Figure 8 with the valves in a "Run and Fill" position; and Figure 10 is a diagrammatic view similar to Figure 8 with the valves in a "Test" position.

Referring now to the drawings for a more detailed disclosure of the device, it will be seen as comprising a transparent burette 10 enclosed in a cylindrical casing 11 formed of perforated metal and supported by upper and lower rectangular brackets 12. A pad 14 is riveted or otherwise suitably secured to the inner surface of the casing to prevent displacement or breakage of the burette. The latter is shown as having the capacity of one-tenth of a United States gallon but may be made of any desired capacity.

The burette is formed with top and bottom neck portions, the former having an enlarged diameter cup portion 18 adapted to receive a bell head 20 which carries a valve stem 22 extending the length of the burette. A valve member 24 is threaded on the lower end of the valve stem and is adapted to seat upwardly against a stationary valve member 23 to close the bottom neck of the burette when the latter has been filled to the level shown in Figure 7, causing the bell head 20, with its entrapped air, to move upwardly due to the buoyant force of the fuel. This arrangement prevents overflow of fuel from the burette and obviates danger of fire to the vehicle.

A plate 26, having a longitudinal slot 28 permitting observation of the fuel level in the burette, is secured to the face of the device by suitable means such as rivets 30. Attachment of the device to the car is accomplished by means of rods 32 suitably secured to the opposite side of the device, the rods being provided with upper bent-over portions 34 adapted to engage the upper edge of a partially lowered window or other available supporting member. Tubes 38 of rubber or other suitable material are sleeved about the upper portions 34 so as to prevent injury to the supporting member. Suction cups 36 are fixed adjacent the lower end of the frame, and are positioned to engage the surface of the window to further secure the device against movement.

A three-way valve 40 having a control lever 42 and adapted to make four connections is provided below the burette in communication therewith within the housing of the device. Conduits 44, 46 and 48, which may be of flexible material, connect the burette by way of the valve 40 with conduit 49 leading from the fuel pump to the carburetor 50, with the fuel pump 52, and with the fuel tank 54.

As seen in Figures 4—A and 4—B, the carburetor 50 is provided with the usual float chamber having an inlet valve 56 controlled by a float 58, and the fuel pump 52 is of the type which maintains a constant outlet pressure, the specific device shown comprising a flexible diaphragm 60 which is yieldingly actuated in its pumping stroke by a spring 62 which is periodically energized by engine-driven cam 64 acting through an overrunning lever connection 66.

When it is desired to test the fuel consumption of a vehicle, the device is placed within the driver's compartment, hung over a window by means of the bent upper portions 34 of the rods 32, and secured thereto by means of the suction cups 36. The conduits 44, 46 and 48 are next suitably secured to the carburetor line, fuel pump, and the fuel tank as illustrated in Figure 4. The vehicle can then be operated normally, the fuel passing from the fuel tank 54, through conduit 48, valve 40, down conduit 46 to the fuel pump 52, and thence to the carburetor. The face of the plate 26 may be marked with three positions, "Run," "Run and Fill" and "Test," as shown, corresponding to the valve positions shown respectively in Figures 4, 5 and 6.

Before the actual testing operation can be performed, the burette 10 must be filled with fuel. This is accomplished by setting the lever 42 to the "Run and Fill" position shown in Figure 5, wherein the valve 40 has been rotated so as to permit communication between the burette and the conduit 44. In this step the fuel from tank 54 passes through conduit 48, valve 40, and conduit 46 to the fuel pump 52, which pumps it to the carburetor 50 through the conduit 49. Since the ordinary fuel pump used on automobiles has sufficient excess capacity, the pump will also fill the burette 10 through conduit 44 and valve 40. As soon as the fuel level at the bell head 20 reaches a predetermined level, it will be moved upwardly to close valve 24 and shut off the fuel supply, whereupon the output of the fuel pump is reduced to the quantity admitted by the float valve 56 of the carburetor. As soon as the burette is filled, the device is in condition for a test run.

As disclosed in Figure 6, when the lever 42 is set to the "Test" position the fuel tank supply is shut off as is the conduit 44, and the fuel pump 52 draws fuel directly from the burette by way of valve 40, the suction exerted by the fuel pump being sufficient to unseat valve 24 and initiate the flow of fuel from the burette. The pump 52 draws fuel directly from the burette and supplies it to the carburetor under the same pressure as obtains in normal operation of the vehicle. The burette 10 is provided with upper and lower marks or graduations 16ª and 16ᵇ at points of reduced burette diameter to increase the accuracy of determining the beginning and ending of the test period. The fuel level in the burette may be observed through the slot 28 of plate 26. When the fuel level in the burette has dropped to the level of the mark 16ª, an odometer reading is taken, and another reading is again taken when the lower mark 16ᵇ has been reached. The mileage recorded between these two points multiplied by ten gives the number of miles the vehicle will travel on a gallon of gas, under the conditions of the test. It is obvious that if the burette has a capacity other than one-tenth of a gallon, a corresponding multiplication factor should be used in determining the mileage per gallon of gasoline of the vehicle. This test may be repeated while the car is operating by simply turning the control lever 42 to refill the burette, and repeating the steps above explained.

In the modification disclosed in Figures 8, 9 and 10, parts corresponding to parts shown in Figures 1 to 7 are designated by the same reference numerals increased by 100. While the function and operation of the testing device shown in the modification corresponds essentially to that above described, the construction varies somewhat in that the three-way valve 40 is replaced by a simple valve 141 and a two-way valve 143.

Valve 141, adapted to communicate with the burette and the valve 143 by means of passage 145, is connected to the carburetor float chamber by means of conduit 144, which communicates with conduit 149 between the fuel pump and the float chamber. During the "Run" position as shown in Figure 8, the valve 141 is closed while valve 143 is in such position as to permit passing of fuel therethrough from the fuel tank 154 to the fuel pump 152 and thence to the carburetor. In order to fill the burette 110, the operator leaves valve 143 in the same position and opens valve 141 (Figure 9). The pump 152 has sufficient capacity to supply the carburetor 150 as well as to fill the burette 110 by way of conduit 144 and valve 141. When the burette is filled and closed by the float-controlled inlet valve, the operator closes valve 141, and when a test run is to be starter, he turns valve 143 to the position shown in Figure 10, to thereby open communication between the fuel pump and the burette and at the same time shut off the tank supply, so that the carburetor is supplied with fuel from the burette. The same procedure as above described will be followed to ascertain the mileage per gallon of fuel.

While two illustrative embodiments have been shown in detail, the invention may be embodied in other forms, and it is not our intention to limit the scope of our invention to those particular embodiments or otherwise than by the terms of the appended claims.

We claim:

1. A device for testing fuel consumption of an internal combustion engine including a fuel tank, a fuel pump, and a carburetor, a calibrated reservoir, a valve casing communicating with said reservoir through a single connection providing both an inlet and an outlet therefor, a first conduit connecting said tank to said casing, a second conduit connecting said pump to said casing, a third conduit connecting said pump to said carburetor, a fourth conduit connecting said third conduit to said casing, a manually operable valve member positioned in said casing, said member operable to a first position to allow communication between said first conduit and said second conduit whereby said pump draws fuel from said tank and delivers the fuel through said third conduit to the carburetor, said member operable to a second position to allow communication between said fourth conduit and said reservoir while maintaining communication between said first and said second conduits whereby said pump delivers the fuel to said reservoir and maintains delivery of fuel to said carburetor, said member operable to a third position to close communication between said first and said second conduits and between said fourth conduit and said reservoir and to allow communication between said reservoir and said second conduit, and a valve positioned in said reservoir which opens in response to suction of said pump when said member is moved to said third position whereby said pump draws fuel from said reservoir and delivers the fuel through said third conduit to the carburetor.

2. A device for testing fuel consumption of an internal combustion engine including a fuel tank, a fuel pump, and a carburetor, a calibrated reservoir, a valve casing communicating with said reservoir through a single connection providing both an inlet and an outlet therefor, a first conduit connecting said tank to said casing, a second conduit connecting said pump to said casing, a third conduit connecting said pump to said carburetor, a fourth conduit connecting said third conduit to said casing, a manually operable valve member positioned in said casing, said member operable to a first position to allow communication between said first conduit and said second conduit whereby said pump draws fuel from said tank and delivers the fuel through said third conduit to the carburetor, said member operable to a second position to allow communication between said fourth conduit and said reservoir while maintaining communication between said first and said second conduits whereby said pump delivers the fuel to said reservoir and maintains delivery of fuel to said carburetor, a valve positioned in said reservoir which closes communication between said fourth conduit and said reservoir when the fuel level in said reservoir reaches a predetermined height, said member operable to a third position to close communication between said first and said second conduits and between said fourth conduits and said reservoir and to allow communication between said reservoir and said second conduit, and said valve opens in response to suction of said pump when said member is moved to said third position whereby said pump draws fuel from said reservoir and delivers the fuel through said third conduit to the carburetor.

3. In a device for measuring fuel, a calibrated fuel reservoir having an open upper end, a combined inlet and outlet conduit connected to the lower end of the reservoir, a movable valve member controlling said conduit and opening downwardly so as to be responsive to the differential of pressures on its opposite sides, and means responsive to the fuel head in the reservoir for moving the valve member to closed position.

CHARLES H. WILEY.
MAURICE BEN HEFTLER.